United States Patent
Yi et al.

(10) Patent No.: US 8,255,691 B2
(45) Date of Patent: Aug. 28, 2012

(54) APPARATUS FOR BATCH VERIFICATION AND METHOD USING THE SAME

(75) Inventors: Jeong Hyun Yi, Daejeon (KR); Eunah Kim, Seoul (KR); Jung Hee Cheon, Seoul (KR)

(73) Assignees: Samsung Electronics Co., Ltd., Suwon-si (KR); Seoul National University Industry Foundation, Seoul (KR)

( * ) Notice: Subject to any disclaimer, the term of this patent is extended or adjusted under 35 U.S.C. 154(b) by 1179 days.

(21) Appl. No.: 11/833,483

(22) Filed: Aug. 3, 2007

(65) Prior Publication Data

US 2008/0226066 A1 Sep. 18, 2008

(30) Foreign Application Priority Data

Mar. 16, 2007 (KR) .................. 10-2007-0026335

(51) Int. Cl.
- *H04L 9/32* (2006.01)
- *H04L 9/00* (2006.01)
- *H04L 9/30* (2006.01)
- *H04K 1/00* (2006.01)

(52) U.S. Cl. ............. 713/176; 713/180; 380/30; 380/44

(58) Field of Classification Search .............. 380/30, 380/44, 47; 713/176, 180
See application file for complete search history.

(56) References Cited

U.S. PATENT DOCUMENTS

| | | | |
|---|---|---|---|
| 4,995,082 A | 2/1991 | Schnorr | |
| 5,347,581 A | 9/1994 | Naccache et al. | |
| 5,502,764 A | 3/1996 | Naccache | |
| 6,212,637 B1 * | 4/2001 | Ohta et al. | 713/176 |
| 6,243,467 B1 * | 6/2001 | Reiter et al. | 380/30 |
| 6,950,937 B2 | 9/2005 | Jakobsson et al. | |
| 6,978,372 B1 | 12/2005 | Jakobsson | |
| 2005/0154879 A1 | 7/2005 | Engberg et al. | |

FOREIGN PATENT DOCUMENTS

| | | |
|---|---|---|
| KR | 1993-7003772 | 11/1993 |
| KR | 1995-27597 | 10/1995 |
| KR | 2001-92190 | 10/2001 |

OTHER PUBLICATIONS

J. Solinas, Efficient Arithmetic on Koblitz Curves, 2000, Kluwer Academic Publishers, pp. 195-249.*

(Continued)

*Primary Examiner* — Philip Chea
*Assistant Examiner* — Trong Nguyen
(74) *Attorney, Agent, or Firm* — NSIP Law (57) ABSTRACT

A batch verification apparatus and method wherein, the method includes: generating a plurality of secret keys, a plurality of public keys corresponding to the plurality of secret keys, and a plurality of verification values corresponding to the plurality of public keys; calculating a first batch verification value based on the plurality of verification values; calculating a second batch verification value based on the plurality of secret keys and the plurality of verification values; comparing the first batch verification value and the second batch verification value; and determining that a batch of the received plurality of verification values is verified when the first batch verification value is equal to the second batch verification value.

38 Claims, 8 Drawing Sheets

OTHER PUBLICATIONS

Stinson et al., Minimality and Other Properties of the Width-w NonAdjacent Form, Jul. 2005, Mathematics of Computation, vol. 75, pp. 369-384.*

Z. Shao, Batch verifying multiple DSA-type digital signatures, Jun. 2001, Elsevier, pp. 383-389.*

Naccache et al., Can D.S.A. be Improved: Complexity Trade-Offs with the Digital Signature Standard, 1995, Advances in Cryptology—Eurocrypt'94, vol. 950/1995, pp. 77-85.*

Yoon et al., Batch Verification with ID-Based Signatures, 2005, Springer-Verlag Berlin Heidelberg, pp. 233-248.*

* cited by examiner

APPARATUS FOR BATCH VERIFICATION AND METHOD USING THE SAME

CROSS-REFERENCE TO RELATED APPLICATION

This application claims the benefit of Korean Patent Application No. 2007-26335, filed on Mar. 16, 2007 in the Korean Intellectual Property Office, the disclosure of which is incorporated herein by reference.

BACKGROUND OF THE INVENTION

1. Field of the Invention

Aspects of the present invention relate to batch verification, and more particularly, to a batch verification apparatus and method that can perform batch verification for a plurality of verification values of a plurality of public keys distributed by a plurality of signers.

2. Description of the Related Art

Many encryption schemes have been developed over time to secure information. For example, ElGamal encryption and elliptic curve cryptography (ECC) are utilized to efficiently secure information.

The ElGamal encryption scheme utilizes an exponentiation operation for an encryption process. In addition to the ElGamal encryption scheme, there are many encryption schemes that utilize the exponentiation operation. In the ElGamal encryption scheme, the length of a key (which is an exponent in the exponentiation operation) must be increased by a predetermined length for more stable information security. However, when the length of the key is increased, a magnitude of the exponentiation operation also increases, resulting in a decreased calculation speed. The decrease in the calculation speed more frequently occurs in a mobile device with limited processor capabilities.

Furthermore, the ECC scheme utilizes a coordinates add operation for an encryption process. In the case of the ECC scheme, the length of a key (which is a coefficient to be multiplied by coordinates in the coordinates add operation) also needs to be increased by a predetermined length for more stable information security. However, when the length of the key is increased, a magnitude of the coordinates add operation also increases, resulting in a decreased calculation speed. As in the ECC scheme, the decrease in the calculation speed more frequently occurs in a mobile device with limited processor capabilities.

Also, as the exponentiation operation is slowed in a device performing many exponentiation operations (for example, a router), a bottleneck phenomenon may result. Moreover, a resource-limited device cannot use an encryption function due to many exponentiation operations.

The exponentiation operation, the coordinate addition, and the like, are used for batch verification. Conventional batch verification includes only batch verification of signatures distributed by an identical signer, and excludes batch verification of signatures distributed by another signer. Specifically, only batch verification of signatures having one secret key is performed. Accordingly, a method of performing a quick calculation and performing batch verification of signatures distributed by other signers is needed.

SUMMARY OF THE INVENTION

Aspects of the present invention provide a batch verification apparatus and method that can perform batch verification of exponentiation values by using a multiplication of result values of the exponentiation values having been distributed, and perform batch verification of coordinate addition values by using an addition of coordinate multiplication result values having been distributed, thereby quickly and efficiently performing the batch verification.

Aspects of the present invention also provide a batch verification apparatus and method that can receive a distributed plurality of digital signatures, based on a plurality of secret keys and a plurality of verification values corresponding to the plurality of secret keys, and perform batch verification by using an exponentiation operation or a calculation of coordinate addition values, thereby performing the batch verification of the plurality of digital signatures distributed by a plurality of different signers.

According to an aspect of the present invention, there is provided a batch verification method, the method including: generating a plurality of secret keys, a plurality of public keys corresponding to the plurality of secret keys, and a plurality of verification values corresponding to the plurality of public keys; calculating a first batch verification value based on the plurality of verification values; calculating a second batch verification value based on the plurality of secret keys and the plurality of verification values; comparing the first batch verification value and the second batch verification value; and determining that a batch of the received plurality of verification values is verified when the first batch verification value is equal to the second batch verification value.

The verification value may be a verification coordinate value.

The generating of the plurality of verification values may include: generating a plurality of keys, each key including at most one coefficient, excluding 0, from among a consecutive w number of coefficients, such that the at most one coefficient is an integer that has an absolute value less than or equal to $q^w/2$ and is indivisible by q, where q is a prime number or a power exponent of the prime number and w is a natural number greater than or equal to 2; performing a coordinate calculation for each of the plurality of generated keys, to generate the plurality of verification coordinate values.

The first batch verification value may be a sum of all verification coordinate values of the received plurality of public keys.

The verification value may be a verification exponent.

The generating of the plurality of verification values may include: generating a plurality of keys, each key including at most one coefficient, excluding 0, from among a consecutive w number of coefficients, such that the at most one coefficient is a positive odd number less than or equal to $2^w$, where w is a natural number greater than or equal to 2; performing an exponentiation for each of the generated plurality of keys to generate the plurality of verification exponents.

The first batch verification value may be a value of multiplying all verification exponentiation values of the received plurality of public keys.

According to another aspect of the present invention, there is provided a batch verification apparatus, the apparatus including: a generator to generate a plurality of secret keys and a plurality of public keys corresponding to the plurality of secret keys; a verification value generator to generate a plurality of verification values corresponding to the plurality of public keys; a first calculator to calculate a first batch verification value based on the plurality of verification values; a second calculator to calculate a second batch verification value based on the plurality of secret keys and the plurality of verification values; and a batch verifier to compare the first batch verification value and the second batch verification value, and determine that a batch of the received plurality of verification values is verified when the first batch verification value is equal to the second batch verification value.

The verification value may be a verification coordinate value.

The verification value generator may include: a key generation manager to generate a plurality of keys, each key including at most one coefficient, excluding 0, from among a consecutive w number of coefficients, such that the at most one coefficient is an integer that has an absolute value less than or equal to $q^w/2$ and is indivisible by q, where q is a prime number or a power exponent of the prime number and w is a natural number greater than or equal to 2; and a verification coordinate value generator to perform a coordinate calculation for each of the plurality of generated keys, to generate the plurality of verification coordinate values.

The verification value may be a verification exponent.

The verification value generator may include: a key generation manager to generate a plurality of keys, each key including at most one coefficient, excluding 0, from among a consecutive w number of coefficients, such that the at most one coefficient is a positive odd number less than or equal to $2^w$, where w is a natural number greater than or equal to 2; and a verification exponent generator to perform an exponentiation for each of the generated plurality of keys in order to generate the plurality of verification exponents.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to present embodiments of the present invention, examples of which are illustrated in the accompanying drawings, wherein like reference numerals refer to the like elements throughout. The embodiments are described below in order to explain the present invention by referring to the figures.

Figure 1:
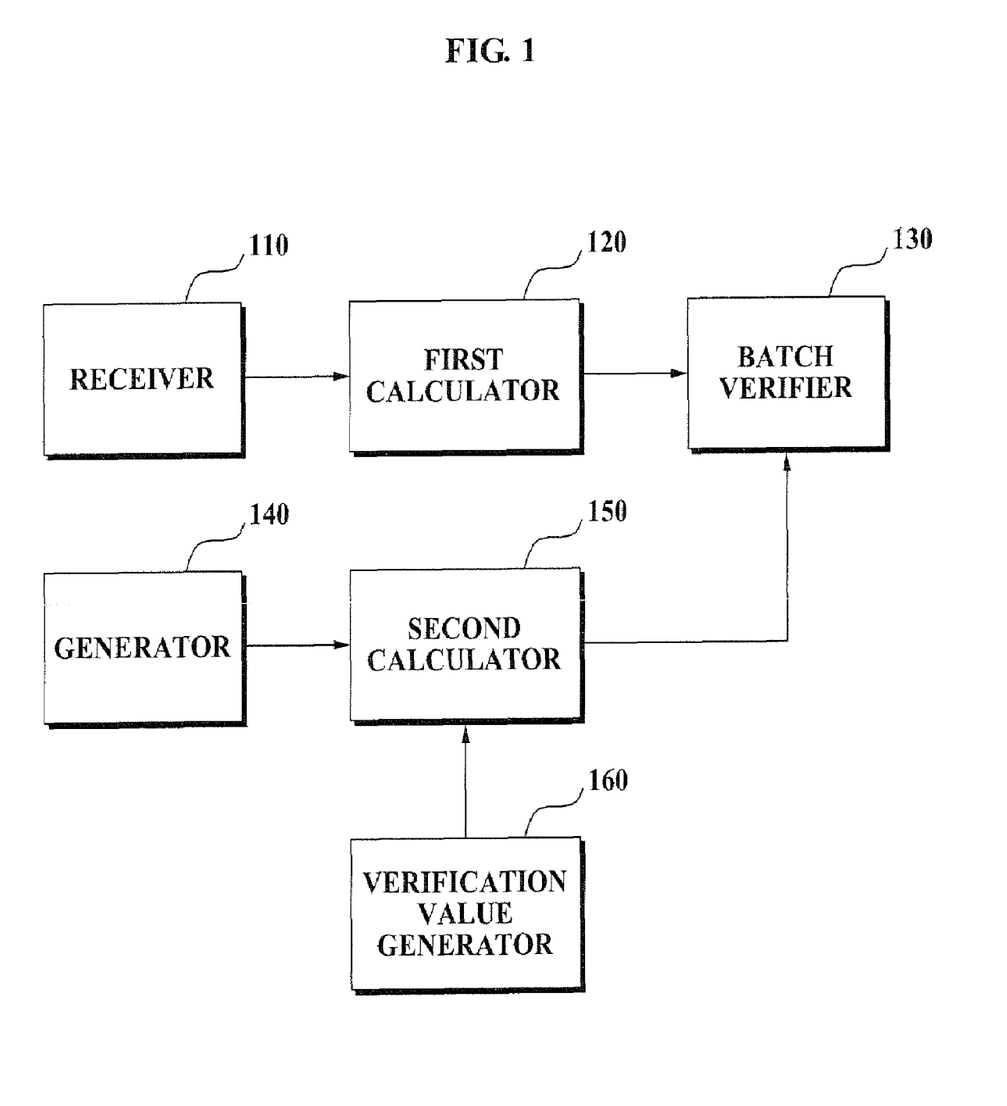
FIG. 1 is a block diagram illustrating a configuration of a batch verification apparatus according to an embodiment of the present invention.

FIG. 1 is a block diagram illustrating a configuration of a batch verification apparatus according to an embodiment of the present invention. Referring to FIG. 1, the batch verification apparatus includes a receiver 110, a first calculator 120, a batch verifier 130, a generator 140, a second calculator 150, and a verification value generator 160.

The receiver 110 receives a plurality of verification values of a plurality of public keys that have been distributed. According to aspects of the present invention, the plurality of verification values may be values obtained by multiplying a public key by a verification coordinate value, or may be verification exponentiation values of the public key. For example, the verification value of a public key $Q_i$ may be $s_i Q_i$, where the verification value $s_i$ is a verification coordinate value, and the verification value of a public key $y_i$ may be $y_i^{s_i}$ where the verification value $s_i$ is a verification exponent.

The generator 140 generates a plurality of secret keys and a plurality of public keys corresponding to the plurality of secret keys.

The verification value generator 160 generates a plurality of verification values corresponding to the plurality of public keys. For example, the verification value generator 160 can generate the verification values using the verification coordinate value or the verification exponent, as described above.

Specifically, the verification value generator 160 can generate a T-adic width-Non Adjacent Form (w-NAF) key, perform a coordinate calculation based on the generated T-adic w-NAF key, and generate the verification coordinate value when the verification value is the verification coordinate value. T-adic w-NAF is a form of combining T with w-NAF, where T indicates $(x, y) \rightarrow (x^q, y^q)$, which is a Frobenius endomorphism map. Moreover, a w-NAF key is a key in which an absolute value of a coefficient, excluding 0, from among coefficients configuring the key is an odd number less than or equal to $2^{w-1}$, the key including at most one coefficient, excluding 0, from among a continuous w number of coefficients. Here, w is a natural number greater than or equal to 2. Furthermore, the T-adic w-NAF key is a key including at most one coefficient, excluding 0, from among a continuous w number of coefficients, the at most one coefficient being an integer that has an absolute value less than or equal to $q^w/2$ and is indivisible by q. Here, q is either a prime number or a power exponent of the prime number.

Alternatively, the verification value generator 160 can generate an unsigned w-NAF key, perform an exponentiation on the generated unsigned w-NAF key, and generate the verification exponent when the verification value is the verification exponent. The unsigned w-NAF key is a key in which a coefficient, excluding 0, from among coefficients is a positive odd number less than or equal to $2^w$, and at most one coefficient, excluding 0, from among a continuous w number of coefficients exists.

The first calculator 120 calculates a first batch verification value based on the plurality of verification values of the plurality of public keys received by the receiver 110. When the verification value is the verification coordinate value, the first calculator 120 can calculate the first batch verification value by adding all of the plurality of verification coordinate values received by the receiver 110 (for example, $s_1 Q_1, s_2 Q_2, s_3 Q_3, \ldots,$ and $s_n Q_n$). When the verification value is the verification exponent, the first calculator 120 can calculate the first batch verification value by multiplying all of the verification exponentiation values received by the receiver 110 (for example, $y_1^{s_1}, y_2^{s_2}, y_3^{s_3}, \ldots,$ and $y_n^{s_n}$).

Specifically, when the verification value is the verification coordinate value, the first batch verification value may be calculated by Equation 1:

$$T = \sum_{i=1}^{n} s_i Q_i \qquad \text{[Equation 1]}$$

where T is a first batch verification value, and $s_i Q_i$ is a verification coordinate value of a public key. When the verification value is the verification exponent, the first batch verification value may be calculated by Equation 2:

$$y = \prod_{i=1}^{n} y_i^{s_i} \qquad \text{[Equation 2]}$$

where y is a first batch verification value, and $y_i^{s_i}$ is a verification exponentiation value of a public key.

The second calculator 150 calculates a second batch verification value based on the plurality of secret keys and the plurality of verification values generated by the generator 140 and the verification value generator 160. When the verification value is the verification coordinate value, the second calculator 150 can calculate the second batch verification value by respectively multiplying the generated plurality of secret keys by the plurality of verification coordinate values corresponding to the plurality of secret keys, and adding all the multiplied values. When the verification value is the verification exponent, the second calculator 150 can calculate the second batch verification value by respectively multiplying the generated plurality of secret keys by the plurality of verification exponents corresponding to the plurality of secret keys, adding all of the multiplied values, and calculating the added values by exponentiation.

Specifically, when the verification value is the verification coordinate value, the second batch verification value can be calculated by Equation 3:

$$Q = cP, \ c = \sum_{i=1}^{n} s_i x_i \bmod \tau^{m-1} + \cdots + \tau + 1 \qquad \text{[Equation 3]}$$

where Q is a second batch verification value, P is a generator of a group, $s_i$ is a verification coordinate value, and $x_i$ is a secret key. When the verification value is the verification exponent, the second batch verification value can be calculated by Equation 4:

$$y' = g^x, \ x = \sum_{i=1}^{n} s_i x_i \qquad \text{[Equation 4]}$$

where y' is a second batch verification value, $s_i$ is a verification exponent, and $x_i$ is a secret key.

The batch verifier 130 compares the first batch verification value calculated by the first calculator 120, and the second batch verification value calculated by the second calculator 150, and verifies a batch of the plurality of verification values received by the receiver 110 when the first batch verification value is the same as the second batch verification value.

For example, when the verification value is the verification coordinate value, the batch verifier 130 compares T calculated by Equation 1 above and Q calculated by Equation 3 above, and verifies a batch of the received plurality of verification coordinate values when T and Q are the same. When the verification value is the verification exponent, the batch verifier 130 compares y calculated by Equation 2 above and y' calculated by Equation 4 above, and determines that a batch of the received plurality of verification exponentiation values of the plurality of public keys is verified when two values are the same.

As described above, the batch verification apparatus according to aspects of the present invention can perform batch verification for the plurality of verification values of the plurality of public keys even when the plurality of public keys and the plurality of secret keys are distributed by a plurality of different signers.

Figure 2:
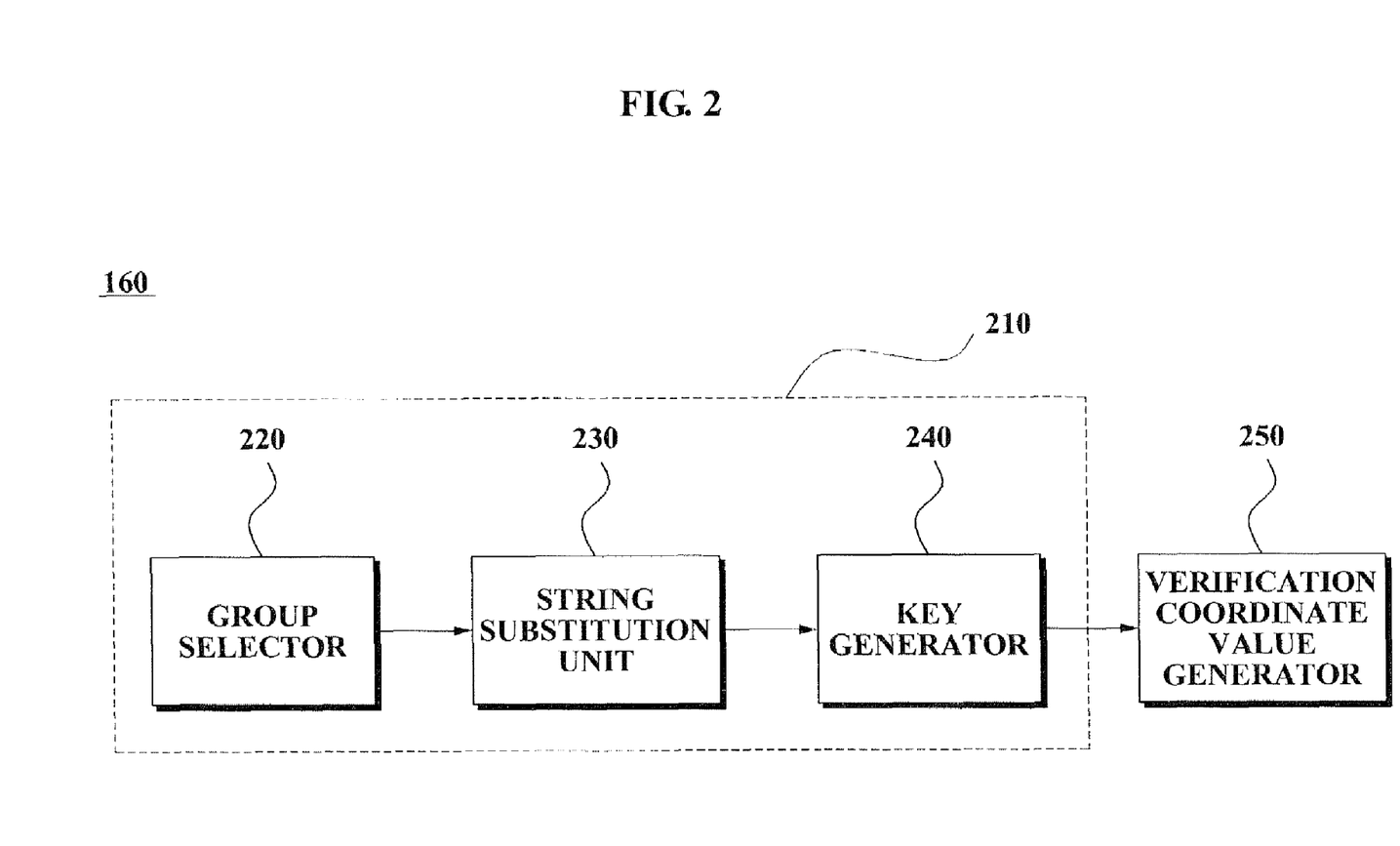
FIG. 2 is a block diagram illustrating a configuration of an embodiment of a verification value generator in FIG. 1.

FIG. 2 is a block diagram illustrating a configuration of an embodiment of the verification value generator 160 in FIG. 1. Specifically, FIG. 2 is a block diagram illustrating a configuration in an example embodiment where a verification value is a verification coordinate value. Referring to FIG. 2, the verification value generator 160 includes a key generation manager 210 and a verification coordinate value generator 250.

The key generation manager 210 generates a plurality of keys in which a coefficient, excluding 0, from among coefficients is an integer that has an absolute value less than or equal to $q^w/2$ and is indivisible by q, the plurality of keys including at most one coefficient, excluding 0, from among a continuous w number of coefficients. In particular, the key generation manager 210 generates a plurality of τ-adic w-NAF keys. Here, w is a natural number greater than or equal to 2.

The key generation manager 210 includes a group selector 220, a string substitution unit 230, and a key generator 240. The group selector 220 selects t number of groups from among m−(w−1)×(t−1)−number of groups. Here, m and t are positive integers.

The string substitution unit 230 substitutes each of the selected t number of groups with a string. The string lists a w−1 number of 0s and one or more integers that have an absolute value less than or equal to $q^w/2$ and are indivisible by q. The one or more integers that have the absolute value less than or equal to $q^w/2$, and are indivisible by q can be listed after the w−1 number of 0s.

The key generator 240 substitutes a non-selected group with 0, and generates the key.

The verification coordinate value generator 250 performs a coordinate calculation based on the plurality of keys generated by the key generation manager 210, and generates the plurality of verification coordinate values. Specifically, the verification coordinate value generator 250 retrieves an initial coefficient, excluding 0, from among coefficients of the τ-adic w-NAF key, and establishes [sign (initial coefficient excluding 0]×|initial coefficient excluding 0|×P as a coordinate addition value. Here, sign(x) is a function to denote a sign of x. Accordingly, sign(x)=1 when x is a positive number, sign(x)=−1 when x is a negative number, and sign(x)=0 when x is 0.

When a next coefficient is 0, the verification coordinate value generator 250 substitutes a value of performing a Frobenius endomorphism map of the coordinate addition value with a new coordinate addition value. When the next coefficient is not 0, the verification coordinate value generator 250 substitutes an addition value of the value of performing the Frobenius endomorphism map of the coordinate addition value, and [sign (next coefficient)]×|next coefficient|×P with the new coordinate addition value. The coordinate addition value acquired by repeatedly performing this process until there is no next coefficient is generated into the verification coordinate value. That is, the verification coordinate value generator 250 generates the plurality of verification coordinate values by performing the above-described coordinate calculation.

Figure 3:
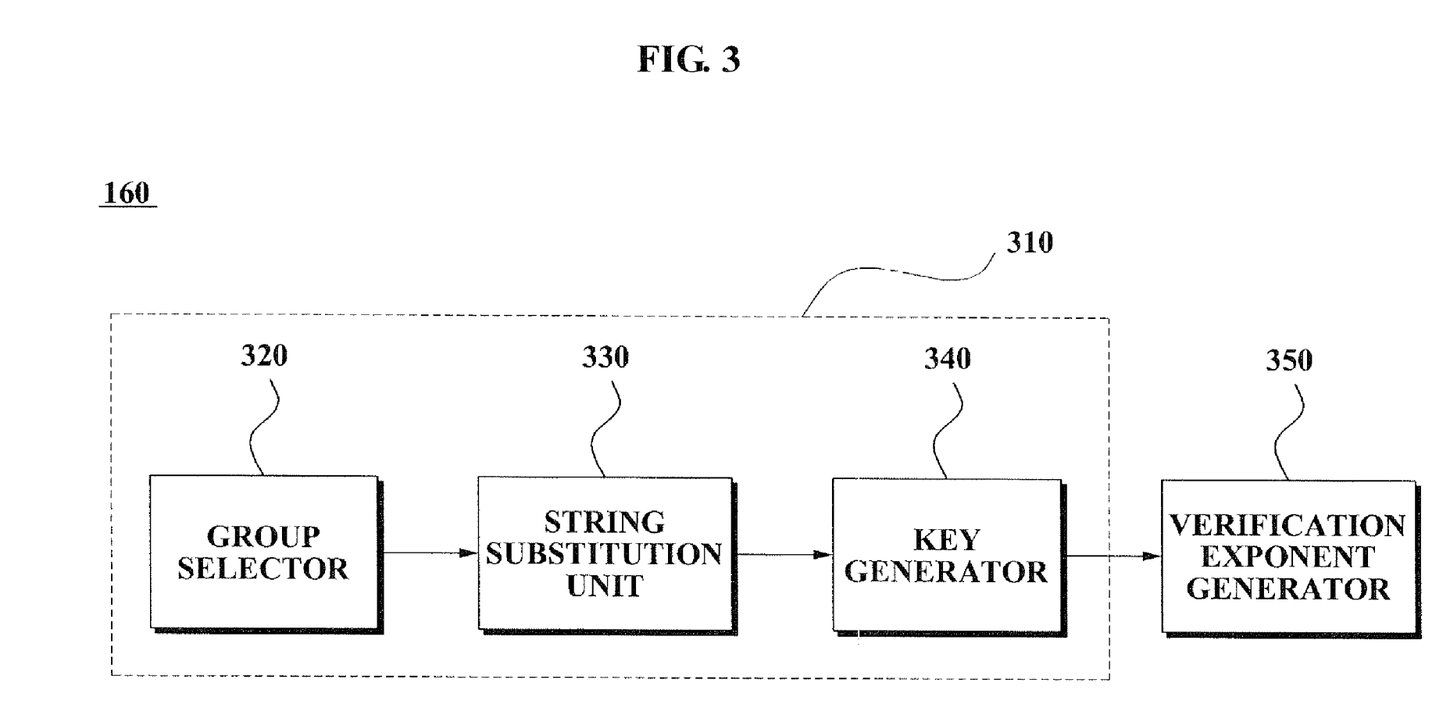
FIG. 3 is a block diagram illustrating a configuration of another embodiment of the verification value generator in FIG. 1.

FIG. 3 is a block diagram illustrating a configuration of another embodiment of the verification value generator 160 in FIG. 1. Specifically, FIG. 3 is a block diagram illustrating a configuration in an example embodiment where a verification value is a verification exponent. Referring to FIG. 3, the verification value generator 160 includes a key generation manager 310 and a verification exponent generator 350.

The key generation manager 310 generates a plurality of keys in which a coefficient, excluding 0, from among coefficients is a positive odd number less than or equal to $2^w$, and at most one coefficient, excluding 0, from among a continuous w number of coefficients exists. In particular, the key generation manager 310 generates a plurality of unsigned w-NAF keys.

The key generation manager 310 includes a group selector 320, a string substitution unit 330, and a key generator 340. The group selector 320 selects t number of groups from among m−(w−1)×t number of groups. Here, m and t are positive integers.

The string substitution unit 330 substitutes each of the selected t number of groups with a string. The string lists w−1 number of 0s and one or more positive odd numbers less than or equal to $2^w$.

The key generator 340 substitutes a non-selected group with 0, and generates the key.

The verification exponent generator 350 calculates, by exponentiation, the plurality of keys generated by the key generation manager 310, and generates a verification exponent. Specifically, the verification exponent generator 350 establishes the unsigned w-NAF key as an exponent, and performs an exponentiation operation. The verification exponent generator 350 establishes, as an exponentiation value, a value $g^{initial\ coefficient\ excluding\ 0}$ in which an initial coefficient, excluding 0, from among coefficients of the unsigned w-NAF key is the exponent, and a base is g. For example, when the unsigned w-NAF key is 00000000100005000003, a value $g^1$ is established as the exponentiation value, where the initial coefficient, excluding 0, from among 00000000100005000003 is 1 and the base is g.

The verification exponent generator 350 substitutes a value of squaring the exponentiation value with a new exponentiation value when a next coefficient is 0. Specifically, since the next coefficient to 1 from among 00000000100005000003 is 0, the exponentiation value $g^1$ is substituted with the new exponentiation value $g^2$. When the next coefficient is not 0, a value acquired by exponentiating the value by g is multiplied by an original exponentiation value and is established as the new exponentiation value. The exponentiation value acquired by repeatedly performing this process until there is no next coefficient is generated into the verification exponent. That is, the verification exponent generator 350 generates the plurality of verification exponents by performing the above-described exponentiation operation.

Figure 4:
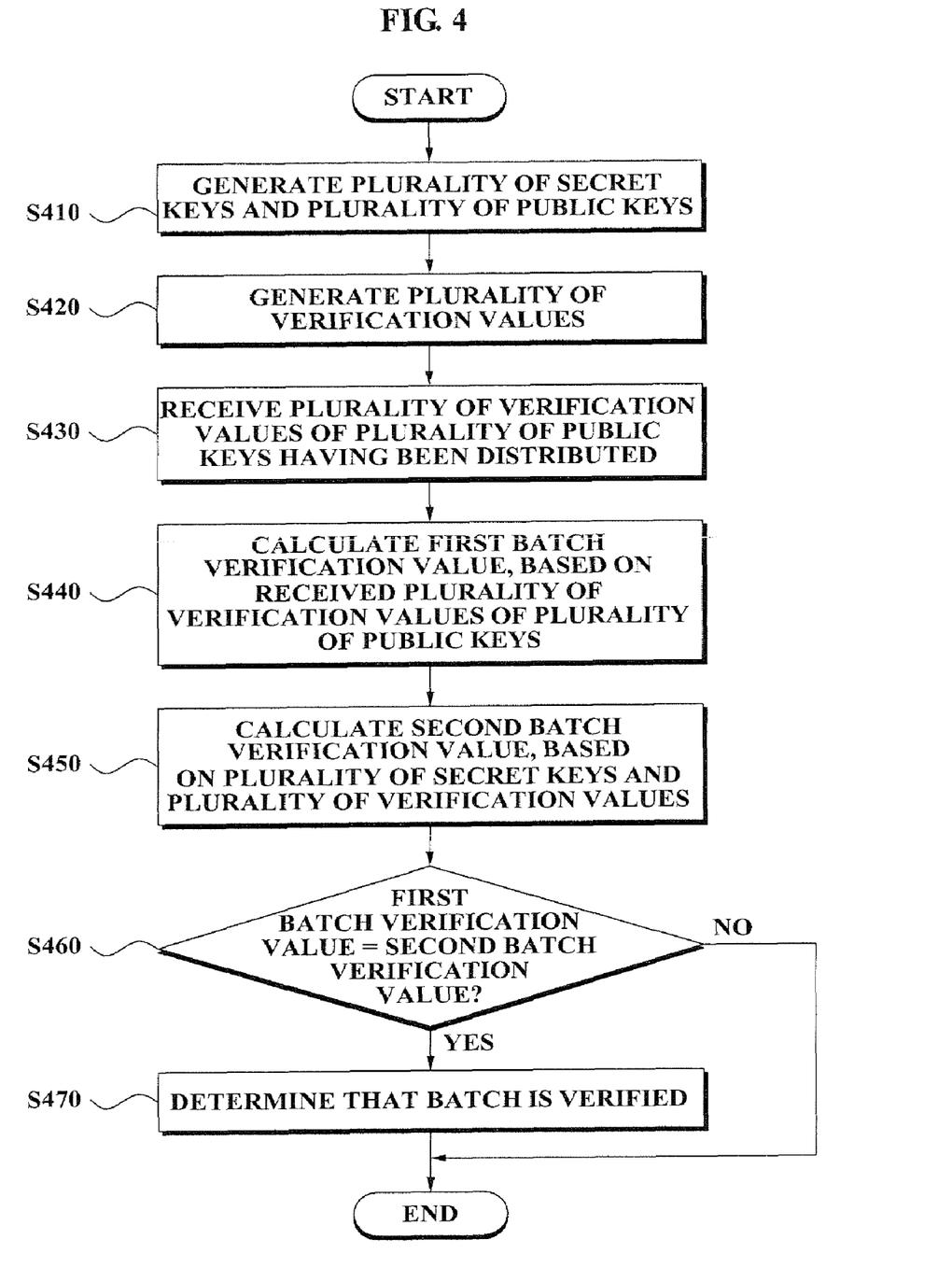
FIG. 4 is a flowchart illustrating a batch verification method according to an embodiment of the present invention.

FIG. 4 is a flowchart illustrating a batch verification method according to an embodiment of the present invention. Referring to FIG. 4, a plurality of secret keys and a plurality of public keys corresponding to the plurality of secret keys are generated in operation S410. Specifically, in the case of an elliptic curve, $(x_1, Q_1), (x_2, Q_2), \ldots,$ and $(x_n, Q_n)$ may be generated, where x is a secret key and Q is a public key corresponding to the secret key. In the case of a finite field, $(x_1, y_1), (x_2, y_2), \ldots,$ and $(x_n, y_n)$ may be generated, where x is a secret key and y is a public key corresponding to the secret key.

When the plurality of secret keys and the plurality of public keys are generated (operation S410), a plurality of verification values corresponding to the plurality of public keys is generated in operation S420. For example, the verification value can be a verification coordinate value in the case of the elliptic curve, and can be a verification exponent in the case of the finite field. The verification coordinate value may be generated by performing a coordinate calculation, based on a τ-adic w-NAF key, and the verification exponent may be generated by performing an exponentiation operation of an unsigned w-NAF key.

When the plurality of verification values is generated (operation S420), the plurality of verification values is distributed. A portion or all of the distributed plurality of verification values is received in operation S430. For example, in the case of the elliptic curve, the plurality of verification coordinate values is distributed. Then, the distributed plurality of verification coordinate values is received in operation S430. In this instance, the verification coordinate value of the public key is a result value $s_i Q_i$ of multiplying a public key $Q_i$ by a verification coordinate value $s_i$. Furthermore, in the case of the finite field, the plurality of verification exponentiation values is distributed. Then, the distributed plurality of verification exponentiation values is received in operation S430. In this instance, the verification exponent value of the public key is a result value $y_i^{s_i}$ of exponentiating a public key $y_i$ by a verification exponent $s_i$.

When the distributed plurality of verification values is received (operation S430), a first batch verification value is calculated based on the received plurality of verification values in operation S440. For example, in the case of the elliptic curve, the first batch verification value is a value of adding all of the plurality of verification coordinate values. Furthermore, in the case of the finite field, the first batch verification value is a value of multiplying all of the plurality of verification exponentiation values. The first batch verification value can be calculated by the above-described Equation 1 or Equation 2.

Next, a second batch verification value is calculated based on the plurality of secret keys and the plurality of verification values in operation S450. For example, in the case of the elliptic curve, the second batch verification value may be acquired by respectively multiplying the generated plurality of secret keys by the plurality of verification coordinate values corresponding to the plurality of secret keys, and adding all of the multiplied values. Furthermore, in the case of the finite field, the second batch verification value may be acquired by respectively multiplying the generated plurality of secret keys by the plurality of verification exponents corresponding to the plurality of secret keys, adding all of the multiplied values, and calculating the added values by exponentiation. Here, the second batch verification value can be calculated by the above-described Equation 3 in the case of the elliptic curve, and can be calculated by the above-described Equation 4 in the case of the finite field.

A batch verification is performed in operation S460 by determining whether the first batch verification value is the same as the second batch verification value.

If it is determined that the calculated first batch verification value is the same as the calculated second batch verification value (operation S460), then it is determined that a batch of the received plurality of verification values of the plurality of public keys is verified in operation S470. In contrast, if it is determined that the calculated first batch verification value is different from the calculated second batch verification value (operation S460), then the batch of the received plurality of verification values of the plurality of public keys is unverified.

Figure 5:
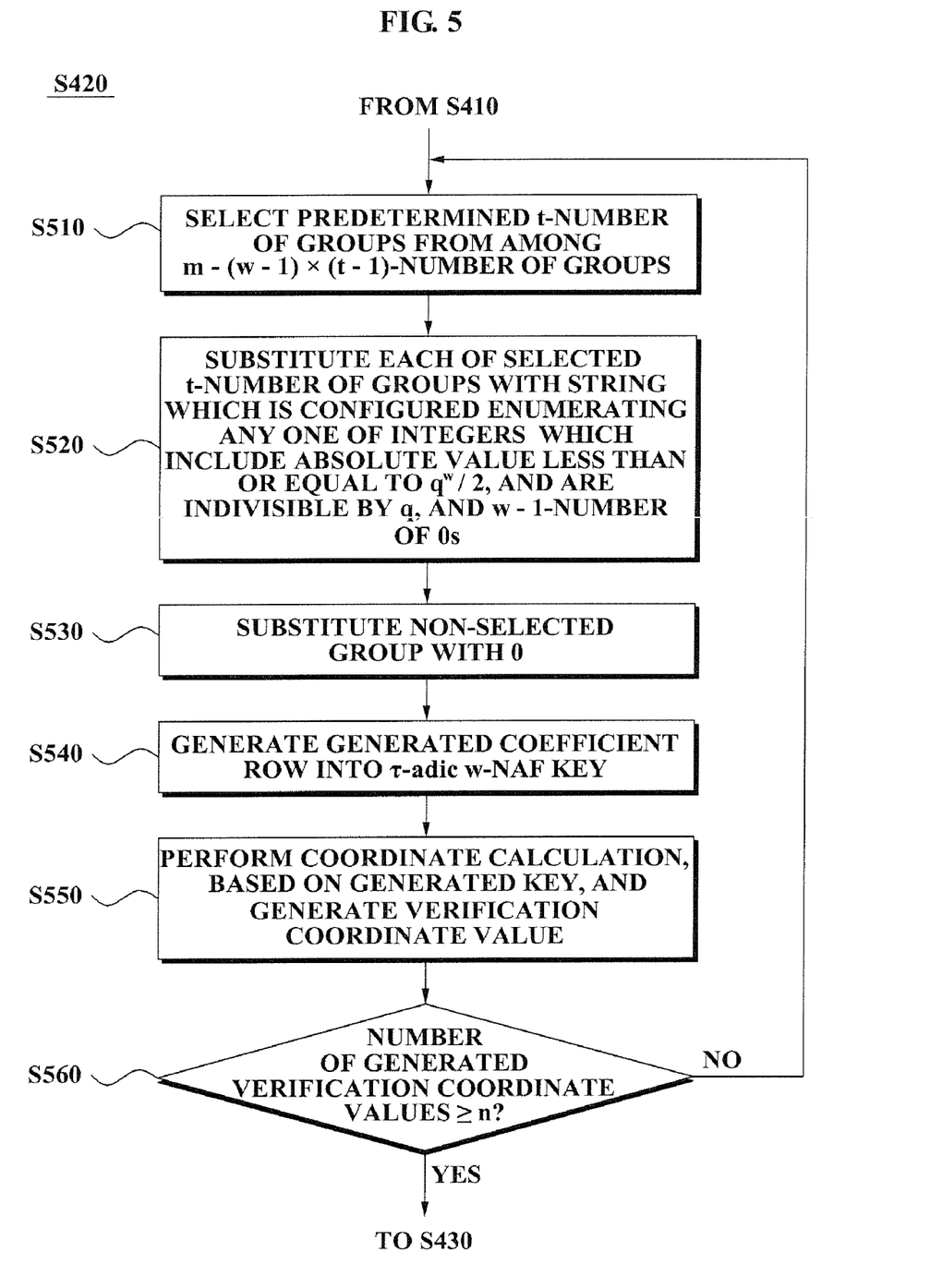
FIG. 5 is a flowchart illustrating an embodiment of the generating of the plurality of verification values (operation S420) in FIG. 4.

FIG. 5 is a flowchart illustrating an embodiment of the generating of the plurality of verification values (operation S420) in FIG. 4. Specifically, FIG. 5 is a flowchart illustrating operations of generating a plurality of verification values in a case of an elliptic curve, where the verification values are verification coordinate values.

Referring to FIG. 5, a predetermined t number of groups from among m−(w−1)×(t−1) number of groups are selected in operation S510. Here, m is an integer related to a number of coefficients of a τ-adic w-NAF key to be generated, w is a positive integer greater than or equal to 2 corresponding to a number of coefficients of a selected group, and t is a positive integer corresponding to a number of coefficients, excluding 0, from among coefficients of the τ-adic w-NAF key.

When the t number of groups are selected (operation S510), each of the selected t number of groups is substituted with a string in operation S520. The string lists w−1 number of 0s and one or more integers that have an absolute value less than or equal to $q^w/2$ and are indivisible by q. According to an aspect of the present invention, the string may list the one or more integers that have an absolute value of less than or equal to $q^w/2$ and are indivisible by q after the w−1 number of 0s. Then, a non-selected group is substituted with 0 in operation S530.

A coefficient row generated by operations S520 and S530 is generated into the τ-adic w-NAF key in operation S540.

A coordinate calculation is performed, based on the generated τ-adic w-NAF key (operation S540), and the verification coordinate value is generated in operation S550. Specifically, an initial coefficient, excluding 0, from among coefficients of the τ-adic w-NAF key is retrieved, and [sign (initial coefficient excluding 0)]×|initial coefficient excluding 0|×P is established as a coordinate addition value.

When a next coefficient is 0, a value of performing a Frobenius endomorphism map of the coordinate addition value is substituted with a new coordinate addition value. When the next coefficient is not 0, an addition value of the value of performing the Frobenius endomorphism map of the coordinate addition value, and [sign(next coefficient)]×|next coefficient|×P is substituted with the new coordinate addition value. The coordinate addition value acquired by repeatedly performing this process until there is no next coefficient is generated into the verification coordinate value in operation S550.

Operations S510 through S550 are repeatedly performed until a predetermined plurality of verification coordinate values is generated in operation S560.

Figure 6:
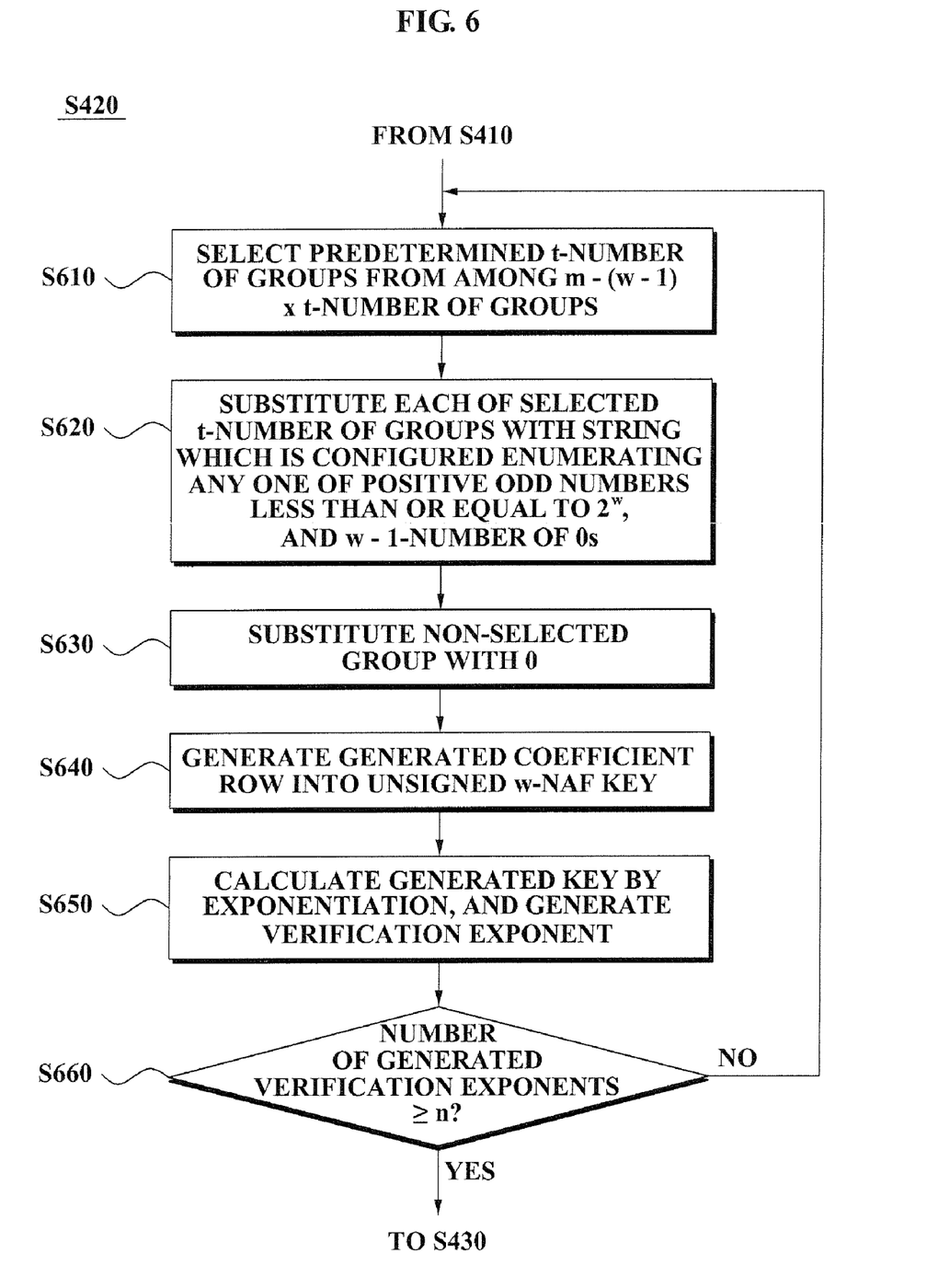
FIG. 6 is a flowchart illustrating another embodiment of the generating of the plurality of verification values (operation S420) in FIG. 4.

FIG. 6 is a flowchart illustrating another embodiment of the generating of the plurality of verification values (operation S420) in FIG. 4. Specifically, FIG. 6 is a flowchart illustrating operations of generating a plurality of verification values in a case of a finite field, where the verification values are verification exponents.

Referring to FIG. 6, a predetermined t number of groups from among m−(w−1)×t number of groups are selected in operation S610. Here, m is an integer related to a number of coefficients configuring of an unsigned w-NAF key to be generated, w is a positive integer greater than or equal to 2 corresponding to a number of coefficients of a selected group, and t is a positive integer corresponding to a number of coefficients, excluding 0, from among coefficients of the unsigned w-NAF key.

When the t number of groups are selected (operation S610), each of the selected t number of groups is substituted with a string in operation S620. The string lists w−1 number of 0s and one or more positive odd numbers less than or equal to $2^w$. According to an aspect of the present invention, the string may list the one or more positive odd numbers less than or equal to $2^w$ after the w−1 number of 0s. Then, a non-selected group is substituted with 0 in operation S630.

A coefficient row generated by operations S620 and S630 is generated into the unsigned w-NAF key in operation S640.

The generated unsigned w-NAF key is calculated by exponentiation, and a verification exponent is generated in operation S650. Specifically, the unsigned w-NAF key is established as an exponent, and an exponentiation operation is performed. A value $g^{initial\ coefficient\ excluding\ 0}$ is established as an exponentiation value, where an initial coefficient, excluding 0, from among coefficients of the unsigned w-NAF key is the exponent, and a base is g. A value of squaring the exponentiation value is substituted with a new exponentiation value when a next coefficient is 0. The exponentiation value acquired by repeatedly performing this process until there is no next coefficient is generated into the verification exponent.

Operations S610 through S650 are repeatedly performed until a predetermined plurality of verification exponents is generated in operation S660.

Figure 7:
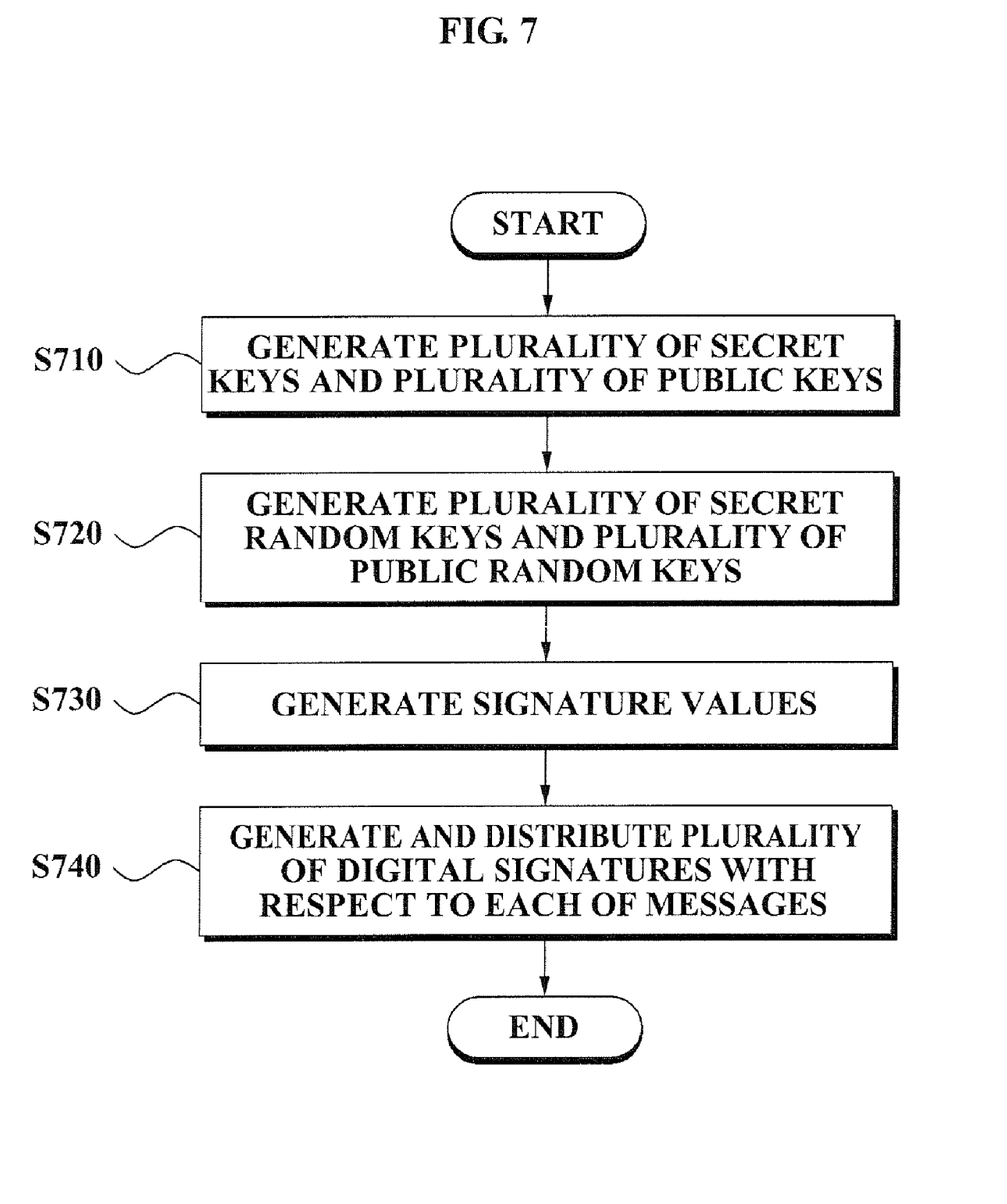
FIG. 7 is a flowchart illustrating a method of generating and distributing a digital signature according to an embodiment of the present invention.
Figure 8:
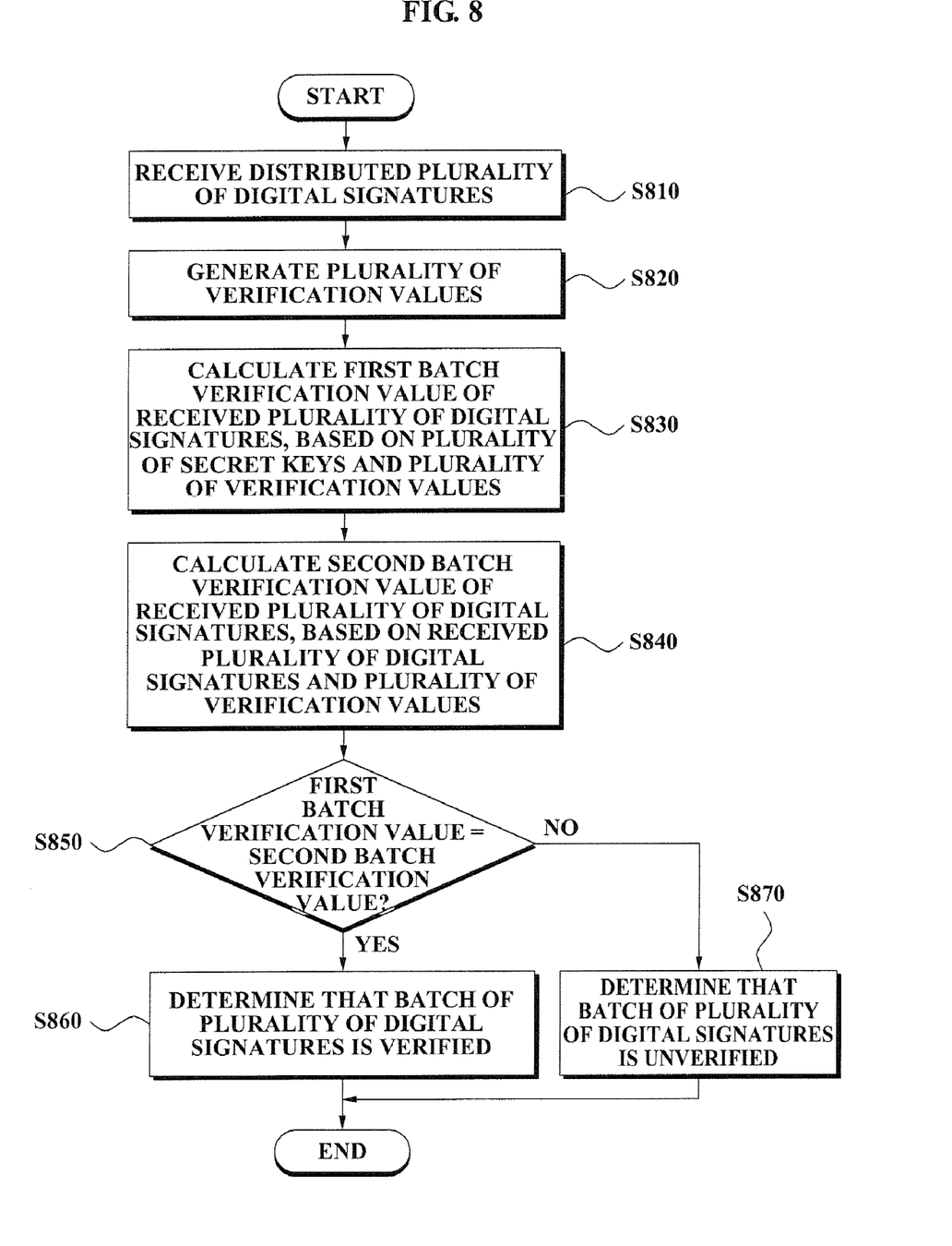
FIG. 8 is a flowchart illustrating a method of receiving a distributed plurality of digital signatures and performing batch verification of the plurality of digital signatures according to an embodiment of the present invention.

FIGS. 7 and 8 are flowcharts illustrating operations of a digital signature to which a batch verification method according to an embodiment of the present invention is applied. Only a case of an elliptic curve is described in FIGS. 7 and 8. However, it is understood that other embodiments of the present invention, such as a case of a finite field, may be applied.

FIG. 7 is a flowchart illustrating a method of generating and distributing a digital signature. Referring to FIG. 7, a plurality of secret keys for generating a signature and a plurality of public keys corresponding to the plurality of secret keys are generated in operation S710. For example, a plurality of secret keys $x_i$ is generated, and a plurality of public keys $Q_i = x_i P$ is generated based on the plurality of secret keys $x_i$. Here, P is a generator of a group.

A plurality of secret random keys for generating a plurality of digital signatures and a plurality of public random keys corresponding to the plurality of secret random keys are generated in operation S720. For example, a plurality of secret random keys $r_i$ is generated, and a plurality of public random keys $R_i = r_i P$ is generated based on the plurality of secret random keys $r_i$.

Then, in operation S730, signature values with respect to messages (for example, a sum in electronic money) are generated based on the generated plurality of secret keys (operation S710), the plurality of secret random keys (operation S720), and the plurality of public random keys (operation S720).

Here, a signature value may be generated by Equation 5:

$$\sigma_i = (r_i + c_i x_i) \bmod p,\ c_i = H(m_i, R_i), \qquad \text{[Equation 5]}$$

where $\sigma_i$ is a signature value, $r_i$ is a secret random key, $x_i$ is a secret key, H is a hash function, $m_i$ is a message, and $R_i$ is a public random key.

When signature values with respect to each of the messages are generated (operation S730), a plurality of digital signatures with respect to each of the messages is generated and distributed in operation S740. The digital signature is configured by the public key, the message, the public random key, and the signature value. That is, the digital signature is configured by ($Q_i, m_i, R_i, \sigma_i$). The plurality of digital signatures generated by the above-described process may be distributed to a user.

FIG. 8 is a flowchart illustrating a method of receiving a distributed plurality of digital signatures and performing batch verification of the plurality of digital signatures according to an embodiment of the present invention. Referring to FIG. 8, the distributed plurality of digital signatures is received in operation S810. Specifically, the distributed plurality of digital signatures, $(Q_1, m_1, R_1, \sigma_1)$, $(Q_2, m_2, R_2, \sigma_2)$, ..., and $(Q_n, m_n, R_n, \sigma_n)$ is received.

When the distributed plurality of digital signatures is received (operation S810), a plurality of verification values corresponding to the plurality of digital signatures (i.e., a plurality of verification coordinate values) is generated in operation S820. According to aspects of the present invention, the plurality of verification coordinate values are not necessarily generated after the distributed plurality of digital signatures is received. For example, the plurality of verification coordinate values may be generated when the plurality of digital signatures is generated and is distributed. Furthermore, when the distributed plurality of digital signatures is received (operation S810), a plurality of verification exponents corresponding to the plurality of digital signatures may be generated in a case of a finite field.

When the plurality of verification values is generated (operation S820), a first batch verification value of the received plurality of digital signatures is calculated based on the generated plurality of secret keys and the plurality of verification values in operation S830. Specifically, the first batch verification value may be generated based on the generated plurality of verification values and the signature values included in the received plurality of digital signatures. For example, the first batch verification value of the received plurality of digital signatures may be calculated by Equation 6:

$$A = \sigma P, \sigma = \sum_{i=1}^{n} s_i \sigma_i \bmod p, \qquad \text{[Equation 6]}$$

where A is a first batch verification value, P is a generator of a group, $s_i$ is a verification value, and $\sigma_i$ is a signature value included in a digital signature.

In operation S840, a second batch verification value of the received plurality of digital signatures is calculated based on the received plurality of digital signatures (operation S810) and the plurality of verification values (operation S820) in order to determine whether the first batch verification value is verified. Specifically, the second batch verification value may be generated based on the generated plurality of verification values, a message included in the received plurality of digital signatures, a public random key, and a public key. For example, the second batch verification value of the received plurality of digital signatures may be calculated by Equation 7:

$$B = T + Q, \qquad \text{[Equation 7]}$$

$$T = \sum_{i=1}^{n} s_i R_i, Q = \sum_{i=1}^{n} s_i c_i Q_i,$$

$$c_i = H(m_i, R_i),$$

where B is a second batch verification value, $s_i$ is a verification coordinate value, $Q_i$ is a public key, H is a hash function, $m_i$ is a message, and $R_i$ is a public random key.

Then, in operation S850, it is determined whether the first batch verification value is same as the second batch verification value.

If it is determined that the first batch verification value is same as the second batch verification value (operation S850), a batch of the received plurality of digital signatures is verified in operation S860.

Conversely, if it is determined that the first batch verification value is different from the second batch verification value, a batch of the received plurality of digital signatures is unverified in operation S870. Specifically, it is determined that at least one of the plurality of digital signatures is unverified.

A batch verification method according to aspects of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like, including a computer data signal embodied in a carrier wave comprising a compression source code segment comprising the code and an encryption source code segment comprising the code (such as data transmission through the Internet). Examples of program instructions include both machine code, such as produced by a compiler, and files containing higher level code that may be executed by the computer using an interpreter. The described hardware devices may be configured to act as one or more software modules in order to perform the operations of aspects of the present invention.

According to aspects of the present invention, there is provided a batch verification apparatus and method that can perform batch verification of exponentiation values by using a multiplication of result values of the exponentiation values having been distributed, and perform batch verification of coordinate addition values by using an addition of coordinate multiplication result values having been distributed, thereby quickly and efficiently performing the batch verification.

Also, according to aspects of the present invention, there is provided a batch verification apparatus and method that can receive a distributed plurality of digital signatures, based on a plurality of secret keys and a plurality of verification values corresponding to the plurality of secret keys, and perform batch verification by using an exponentiation operation or a calculation of coordinate addition values, thereby performing the batch verification of the plurality of digital signatures distributed by a plurality of other signers.

Although a few embodiments of the present invention have been shown and described, it would be appreciated by those skilled in the art that changes may be made to these embodiments without departing from the principles and spirit of the invention, the scope of which is defined by the claims and their equivalents.

What is claimed is:

1. A batch verification method performed by a batch verification apparatus, the method comprising:
generating a plurality of secret keys and a plurality of public keys corresponding to the plurality of secret keys;
generating a plurality of verification values corresponding to the plurality of public keys;
storing the plurality of public keys, the plurality of secret keys, and the plurality of verification values in a memory of the batch verification apparatus;
distributing the plurality of verification values to a plurality of signers;
receiving, from the plurality of signers, a plurality of distributed verification values;
calculating a first batch verification value based on the received plurality of verification values;
calculating a second batch verification value based on the plurality of secret keys and the received plurality of verification values; and
comparing the first batch verification value and the second batch verification value to determine whether a batch of the received plurality of verification values is verified, wherein the batch of the received plurality of verification values is verified if the first batch verification value is equal to the second batch verification value,
wherein the first batch verification value is calculated differently based on determining if the received plurality of distributed verification values are verification coordinate values or verification exponents, and the second batch verification value is calculated differently based on determining if the generated plurality of verification values are verification coordinate values or verification exponents.

2. The method as claimed in claim 1, wherein the plurality of verification values is a plurality of verification coordinate values.

3. The method as claimed in claim 2, wherein the generating of the plurality of verification values comprises:
generating a plurality of keys, each key including at most one coefficient, excluding 0, from among a consecutive w number of coefficients, such that the at most one coefficient is an integer that has an absolute value less than or equal to $q^w/2$, and is indivisible by q, where q is a prime number or a power exponent of the prime number and w is a natural number greater than or equal to 2; and
performing a coordinate calculation for each of the plurality of generated keys, to generate the plurality of verification coordinate values.

4. The method as claimed in claim 3, wherein the generating of the plurality of keys comprises:
selecting, for each of the plurality of keys, a t number of groups from among m−(w−1)×(t−1) number of groups, where m and t are positive integers;
substituting each of the selected t number of groups with a string, the string listing a w−1 number of 0s and one or more integers that have the absolute value less than or equal to $q^w/2$ and are indivisible by q; and
substituting a non-selected group with 0.

5. The method as claimed in claim 4, wherein the string lists the one or more integers that have the absolute value less than or equal to $q^w/2$ and are indivisible by q after the w−1 number of 0s.

6. The method as claimed in claim 3, wherein the generating of the plurality of keys comprises:
generating a plurality of τ-adic width-Non Adjacent Form keys.

7. The method as claimed in claim 2, wherein the calculating of the first batch verification value comprises:
summing all of the plurality of verification coordinate values.

8. The method as claimed in claim 1, wherein the plurality of verification values is a plurality of verification exponents.

9. The method as claimed in claim 8, wherein the generating of the plurality of verification values comprises:
generating a plurality of keys, each key including at most one coefficient, excluding 0, from among a consecutive w number of coefficients, such that the at most one coefficient is a positive odd number less than or equal to $2^w$, where w is a natural number greater than or equal to 2;
performing an exponentiation for each of the generated plurality of keys to generate the plurality of verification exponents.

10. The method as claimed in claim 9, wherein the generating of the plurality of keys comprises:
selecting, for each of the plurality of keys, a t number of groups from among m−(w−1)×t number of groups, where m and t are positive integers;
substituting each of the selected t number of groups with a string, the string listing a w−1 number of 0s and one or more positive odd numbers less than or equal to $2^w$; and
substituting a non-selected group with 0.

11. The method as claimed in claim 10, wherein the string lists the one or more positive odd numbers less than or equal to $2^w$ after the w−1 number of 0s.

12. The method as claimed in claim 9, wherein the generating of the plurality of keys comprises:
generating a plurality of unsigned width-Non Adjacent Form keys.

13. The method as claimed in claim 8, wherein the calculating of the first batch verification value comprises:
multiplying all of the plurality of verification exponents.

14. A non-transitory computer-readable recording medium encoded with the method of claim 1 and implemented by a computer.

15. A batch verification apparatus, the apparatus comprising:
a generator to generate a plurality of secret keys and a plurality of public keys corresponding to the plurality of secret keys;
a verification value generator to generate a plurality of verification values corresponding to the plurality of public keys;
a memory for storing the plurality of public keys, the plurality of secret keys, and the plurality of verification values;
a receiver to receive, from a Plurality of signers, a plurality of verification values that are distributed among the plurality of signers;
a first calculator to calculate a first batch verification value based on the received plurality of verification values;
a second calculator to calculate a second batch verification value based on the plurality of secret keys and the generated plurality of verification values; and
a batch verifier to compare the first batch verification value and the second batch verification value in order to determine whether a batch of the plurality of received verification values is verified, wherein the batch of the plurality of received verification values is verified if the first batch verification value is equal to the second batch verification value,
wherein the first batch verification value is calculated differently based on determining if the received plurality of verification values are verification coordinate values or verification exponents, and the second batch verification value is calculated differently based on determining if the generated plurality of verification values are verification coordinate values or verification exponents.

16. The apparatus as claimed in claim 15, wherein the plurality of verification values is a plurality of verification coordinate values.

17. The apparatus as claimed in claim 16, wherein the verification value generator comprises:
a key generation manager to generate a plurality of keys, each key including at most one coefficient, excluding 0, from among a consecutive w number of coefficients, such that the at most one coefficient is an integer that has an absolute value less than or equal to $q^w/2$, and is indivisible by q, where q is a prime number or a power exponent of the prime number and w is a natural number greater than or equal to 2; and
a verification coordinate value generator to perform a coordinate calculation for each of the plurality of generated keys, to generate the plurality of verification coordinate values.

18. The apparatus as claimed in claim 17, wherein the key generation manager comprises:
a group selector to select, for each of the plurality of keys, a t number of groups from among m−(w−1)×(t−1) number of groups, where m and t are positive integers;
a string substitution unit to substitute each of the selected t number of groups with a string, the string listing a w−1 number of 0s and one or more integers that have the absolute value less than or equal to $q^w/2$ and are indivisible by q; and
a key generator to substitute a non-selected group with 0.

19. The apparatus as claimed in claim 18, wherein the string lists the one or more integers that have the absolute value less than or equal to $q^w/2$ and are indivisible by q after the w−1 number of 0s.

20. The apparatus as claimed in claim 17, wherein the key generation manager generates a plurality of τ-adic width-Non Adjacent Form keys.

21. The apparatus as claimed in claim 16, wherein the first calculator calculates the first batch verification value by summing all of the plurality of verification coordinate values.

22. The apparatus as claimed in claim 15, wherein the plurality of verification values is a plurality of verification exponents.

23. The apparatus as claimed in claim 22, wherein the verification value generator comprises:
a key generation manager to generate a plurality of keys, each key including at most one coefficient, excluding 0, from among a consecutive w number of coefficients, such that the at most one coefficient is a positive odd number less than or equal to $2^w$, where w is a natural number greater than or equal to 2; and
a verification exponent generator to perform an exponentiation for each of the generated plurality of keys in order to generate the plurality of verification exponents.

24. The apparatus as claimed in claim 23, wherein the key generation manager comprises:
a group selector to select, for each of the plurality of keys, a t number of groups from among m−(w−1)×t number of groups, where m and t are positive integers;
a string substitution unit to substitute each of the selected t number of groups with a string, the string listing a w−1 number of 0s and one or more positive odd numbers less than or equal to $2^w$; and
a key generator to substitute a non-selected group with 0.

25. The apparatus as claimed in claim 24, wherein the string lists the one or more positive odd numbers less than or equal to $2^w$ after the w−1 number of 0s.

26. The apparatus as claimed in claim 23, wherein the key generation manager generates a plurality of unsigned width-Non Adjacent Form keys.

27. The apparatus as claimed in claim 22, wherein the first calculator calculates the first batch verification value by multiplying all of the plurality of verification exponents.

28. A method of verifying a batch of a plurality of digital signatures performed by a batch verification apparatus, the method comprising:
generating a plurality of secret keys and a plurality of public keys corresponding to the plurality of secret keys;
generating a plurality of secret random keys and a plurality of public random keys corresponding to the plurality of secret random keys;
generating signature values, corresponding to messages, based on the generated plurality of secret keys, the generated plurality of secret random keys, and the generated plurality of public random keys;
generating a plurality of digital signatures, corresponding to each of the messages, based on the generated signature values;
storing the plurality of public keys, the plurality of secret keys, and the plurality of digital signatures in a memory of the batch verification apparatus;
distributing the plurality of digital signatures to a plurality of signers;
receiving, from the plurality of signers, a plurality of distributed digital signatures;
generating a plurality of verification values corresponding to the received plurality of distributed digital signatures;
calculating a first batch verification value of the received plurality of distributed digital signatures based on the plurality of secret keys and the plurality of verification values;
calculating a second batch verification value of the received plurality of distributed digital signatures based on the received plurality of distributed digital signatures and the plurality of verification values; and
comparing the first batch verification value and the second batch verification value to determine whether a batch of the plurality of digital signatures is verified, wherein the batch of the plurality of digital signatures is verified if the first batch verification value is equal to the second batch verification value,
wherein the first batch verification value is calculated differently based on determining if the plurality of verification values are verification coordinate values or verification exponents, and the second batch verification value is calculated differently based on determining if the plurality of verification values are verification coordinate values or verification exponents.

29. The method as claimed in claim 28, wherein the generating of the plurality of signature values comprises:
generating the plurality of signature values according to an equation: $\sigma_i=(r_i+c_i x_i) \mod p$, $c_i=H(m_i,R_i)$, where $\sigma_i$ is a signature value, $r_i$ is a secret random key, $x_i$ is a secret key, H is a hash function, $m_i$ is a message, and $R_i$ is a public random key.

30. The method as claimed in claim 28, wherein the plurality of verification values is a plurality of verification coordinate values.

31. The method as claimed in claim 30, wherein the generating of the plurality of verification values comprises:

generating a plurality of keys, each key including at most one coefficient, excluding 0, from among a consecutive w number of coefficients, such that the at most one coefficient is an integer that has an absolute value less than or equal to $q^w/2$, and is indivisible by q, where q is a prime number or a power exponent of the prime number and w is a natural number greater than or equal to 2; and performing a coordinate calculation for each of the plurality of generated keys, to generate the plurality of verification coordinate values.

32. The method as claimed in claim 31, wherein the generating of the plurality of keys comprises:

selecting, for each of the plurality of keys, a t number of groups from among m−(w−1)×(t−1) number of groups, where m and t are positive integers;

substituting each of the selected t number of groups with a string, the string listing a w−1 number of 0s and one or more integers that have the absolute value less than or equal to $q^w/2$ and are indivisible by q; and substituting a non-selected group with 0.

33. The method as claimed in claim 28, wherein the plurality of verification values is a plurality of verification exponents.

34. The method as claimed in claim 33, wherein the generating of the plurality of verification values comprises:

generating a plurality of keys, each key including at most one coefficient, excluding 0, from among a consecutive w number of coefficients, such that the at most one coefficient is a positive odd number less than or equal to $2^w$, where w is a natural number greater than or equal to 2;

performing an exponentiation for each of the generated plurality of keys to generate the plurality of verification exponents.

35. The method as claimed in claim 34, wherein the generating of the plurality of keys comprises:

selecting, for each of the plurality of keys, a t number of groups from among m−(w−1)×t number of groups, where m and t are positive integers;

substituting each of the selected t number of groups with a string, the string listing a w−1 number of 0s and one or more positive odd numbers less than or equal to $2^w$; and substituting a non-selected group with 0.

36. The method as claimed in claim 28, wherein the calculating of the first batch verification value comprises:

calculating the first batch verification value according to an equation:

$$A = \sigma P, \sigma = \sum_{i=1}^{n} s_i \sigma_i \bmod p,$$

where A is the first batch verification value, P is a generator of a group, $s_i$ is a verification value, and $\sigma_i$ is a signature value included in a digital signature.

37. The method as claimed in claim 28, wherein the calculating of the second batch verification value comprises:

calculating the second batch verification value according to an equation:

$$B = T + Q,$$
$$T = \sum_{i=1}^{n} s_i R_i, Q = \sum_{i=1}^{n} s_i c_i Q_i,$$
$$c_i = H(m_i, R_i),$$

where B is the second batch verification value, $s_i$ is a verification coordinate value, $Q_i$ is a public key, H is a hash function, $m_i$ is a message, and $R_i$ is a public random key.

38. The method as claimed in claim 28, wherein the generating of the plurality of digital signatures comprises:

generating a first digital signature in a first signer; and
generating a second digital signature in a second signer, different from the first signer.

* * * * *